United States Patent
Damke et al.

(10) Patent No.: US 10,889,682 B2
(45) Date of Patent: Jan. 12, 2021

(54) SILYLATED POLYURETHANES AND METHODS FOR PREPARING THEREOF

(71) Applicant: Henkel AG & Co. KGaA, Duesseldorf (DE)

(72) Inventors: Jan-Erik Damke, Duesseldorf (DE); Johann Klein, Duesseldorf (DE); Esteban Mejia, Rostock (DE); Rok Brisar, Rostock (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/742,988

(22) Filed: Jan. 15, 2020

(65) Prior Publication Data

US 2020/0148808 A1    May 14, 2020

Related U.S. Application Data

(63) Continuation of application No. PCT/EP2018/053738, filed on Feb. 15, 2018.

(30) Foreign Application Priority Data

Jul. 21, 2017 (EP) .................................... 17182578

(51) Int. Cl.

| | |
|---|---|
| C08G 18/28 | (2006.01) |
| C08G 18/10 | (2006.01) |
| C08G 18/24 | (2006.01) |
| C08G 18/48 | (2006.01) |
| C08G 18/75 | (2006.01) |
| C09D 175/04 | (2006.01) |
| C09J 175/04 | (2006.01) |

(52) U.S. Cl.
CPC ........... *C08G 18/289* (2013.01); *C08G 18/10* (2013.01); *C08G 18/246* (2013.01); *C08G 18/4825* (2013.01); *C08G 18/755* (2013.01); *C09D 175/04* (2013.01); *C09J 175/04* (2013.01)

(58) Field of Classification Search
None
See application file for complete search history.

(56) References Cited

U.S. PATENT DOCUMENTS

| | | | |
|---|---|---|---|
| 3,146,250 | A | 8/1964 | Speier |
| 3,632,557 | A | 1/1972 | Brode et al. |
| 4,222,925 | A | 9/1980 | Bryant et al. |
| 4,794,192 | A | 12/1988 | Stein |
| 4,924,021 | A | 5/1990 | Kotzsch et al. |
| 5,364,955 | A | 11/1994 | Zwiener et al. |
| 6,162,938 | A | 12/2000 | Hansen et al. |
| 6,762,270 | B2 | 7/2004 | Ludewig et al. |
| 2001/0034403 | A1 | 10/2001 | Takuman et al. |
| 2005/0090574 | A1 | 4/2005 | Mitani et al. |
| 2007/0055036 | A1 | 3/2007 | Nagy |
| 2007/0060732 | A1 | 3/2007 | Yang et al. |

(Continued)

FOREIGN PATENT DOCUMENTS

| | | |
|---|---|---|
| EP | 0931800 A1 | 7/1999 |
| JP | 2002193978 A | 7/2002 |

(Continued)

OTHER PUBLICATIONS

Sami et al., Understanding the influence of hydrogen bonding and diisocyanate symmetry . . . , Polymer 55 (2014) (18): pp. 4563-4576.
DIN 55672-1:2007-08.
D'Yakov V M et al: "Medium-Sized 1-15 Silicon-Containing Rings. III. Carbo- and Silico-Functional Derivatives of 2-Organyl-1,3,6,2-Dioxazasi Locanes and Their Reactions" Russian Journal of General Chemis, M.A I K Nauka-Interperiodica, RU, vol. 62, No. 2, Feb. 1, 1992 (Feb. 1, 1992), pp. 352-358.
Koemer et al., Die Makromolekulare Chemie 97 (1966) pp. 241-247.
Tanino et al., The Journal of Organic Chemistry, 1997, 62, pp. 4206-4207.

(Continued)

*Primary Examiner* — Robert S Loewe
(74) *Attorney, Agent, or Firm* — James E. Piotrowski

(57) ABSTRACT

The present invention discloses silylated polyurethanes obtainable by reacting at least one polyols, at least one polyisocyanates, at least one silicon-containing heterocycle of the general formula (I):

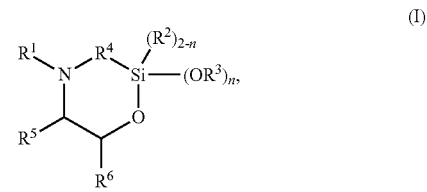

wherein $R^1$ is hydrogen;
$R^2$ and $R^3$ are same or different and are, independently from one another, selected from a linear or branched, substituted or unsubstituted $C_1$-$C_{20}$ alkyl or $C_6$-$C_{18}$ aryl residue which may be interrupted by at least one heteroatom;
$R^4$ is selected from a linear or branched, substituted or unsubstituted $C_1$-$C_{20}$ alkylene residue which may be interrupted by at least one heteroatom;
$R^5$ and $R^6$ are same or different and are, independently from one another, selected from the group consisting of hydrogen, a linear or branched, substituted or unsubstituted $C_1$-$C_{20}$ alkyl or $C_6$-$C_{18}$ aryl which may be interrupted by at least one heteroatom, and a $C_4$-$C_8$ cycloalkyl, or $R^5$ and $R^6$ may form a ring, preferably a 4- to 8-membered alkyl ring; and
n is 0, 1 or 2,
their preparation methods, curable compositions comprising the silylated polyurethanes, and their use as adhesive, sealant, spray foam and/or coating.

20 Claims, No Drawings

(56) References Cited

U.S. PATENT DOCUMENTS

2010/0234502 A1    9/2010   Iwasaki et al.
2015/0284610 A1    10/2015   Zander et al.

FOREIGN PATENT DOCUMENTS

| JP | 2010001255 A | 1/2010 |
| WO | 03066701 A1 | 8/2003 |
| WO | 03091186 A2 | 11/2003 |

OTHER PUBLICATIONS

Bear et al., The Journal of Organic Chemistry, 2002, 67, pp. 2056-2064.
Chvalovsky and El-Hamouly (Tetrahedron, 1983, 39, 1195-1197).
Trost and Ball (Journal of the American Chemical Society, 2005, 127, 17644-17655).
Ladilina et al., Polymer Science Series B, 2015, 57, 150-158.
International Search Report for International PCT Patent Application No. PCT/EP2018/053738 dated May 29, 2018.
Rossmy et al., (Die Makromolekulare Chemie 1964, 73, pp. 85-108.

SILYLATED POLYURETHANES AND METHODS FOR PREPARING THEREOF

TECHNICAL FIELD

The present invention relates to silylated polyurethanes obtainable by reacting at least one polyol, at least one polyisocyanate, and at least one silicon-containing heterocycle of the general formula (I) as defined herein and their preparation methods, curable compositions comprising the silylated polyurethane and their use as adhesive, sealant, spray foam and/or coating.

BACKGROUND OF THE INVENTION

One-component, moisture-curing adhesives and sealants have played a significant role in many technical applications for years. In addition to the polyurethane adhesives and sealants having free isocyanate groups and the traditional silicone adhesives and sealants based on dimethyl polysiloxanes, the use of so-called modified silane adhesives and sealants has also gained ground in recent times. As compared with polyurethane adhesives and sealants, silane-modified adhesives and sealants have the advantage of being free from isocyanate groups, in particular monomeric diisocyanates, and they are also distinguished by a broad spectrum of adhesion on a wide range of substrates without surface pretreatment with primers.

In particular, in the presence of atmospheric moisture, polymers having reactive alkoxysilyl groups are capable of condensing with one another even at room temperature, eliminating alcohol molecules. Depending on the content of alkoxysilyl groups and their structure, this causes mainly long-chain polymers (thermoplastics), relatively coarse-meshed three-dimensional networks (elastomers) or highly crosslinked systems (thermosets) to form.

Aminoalkoxysilanes are frequently used in adhesive formulations as polymer endcapping agents for moisture curable compositions. Various aminoalkoxysilanes used for endcapping polymers are disclosed in U.S. Pat. Nos. 3,632,557, 6,162,938, 5,364,955 among others.

One of the most popular alkoxysilane systems for moisture-curable compositions is aminoalkyltrimethoxysilane in the presence of a Lewis acid catalyst. However, during hydrolysis a large amount of methanol is produced, which is toxic and therefore undesirable in everyday consumer applications. In the last years a considerable attention has been directed in to the reduction of the amount of alcohol expelled during the curing process.

In addition, the resulting functional group from the reaction of amine with isocyanate-terminated polymers is urea. Urea linkage serves as an important group in the adhesive formulations due to its stability and hydrophilic character. However, its ability to form strong hydrogen bonds significantly increases the viscosity of the prepolymer after the endcapping. The influence of hydrogen bonding in polyurethanes is investigated in depth in by Wilkes et al. (Sami, S.; Yildirim, E.; Yurtsever, M.; Yurtsever, E.; Yilgor, E.; Yilgor, I.; Wilkes, G. L.; Polymer, 2014. 55(18): p. 4563-4576). They showed that ordered structures can be formed inside the polymer matrix, which are connected by hydrogen bonds. These so-called "hard segments" restrict the chain movement and therefore increase the viscosity of the polymer. Increased viscosity limits the processability of the final product and needs to be avoided in some cases.

Furthermore, primary amine-functionalized alkoxysilanes are extremely reactive towards many electrophiles, like isocyanates, aldehydes and anhydrides, which makes them difficult to handle and store. Fast and highly exothermic reactions impose processing and safety difficulties in the larger scale. Furthermore, high reaction rates often result in low reaction selectivity and oligomerization.

Therefore, a need still exists for silane-modified polymers which overcome at least some of the drawbacks of the known systems.

SUMMARY OF THE INVENTION

The object of the present invention is therefore to provide silane-modified polymers which solves some of the drawbacks of the known systems.

It has been found that the object is achieved by introducing silicon-containing heterocycles of the general formula (I) as described herein. The alkoxy adducts of cyclic silanes having one alkoxide residue may lead to up to 33% less expelled alcohol compared to aminoalkyltrimethoxysilane while showing a comparable curing speed. In addition, the introduction of the silicon-containing heterocycle of the general formula (I) lowers the viscosity of the prepolymer due to their diminished propensity towards hydrogen bond formation. Furthermore, the silicon-containing heterocycle of the general formula (I) is considerably less reactive, allowing a better reaction control and higher storage stability.

The present invention provides a silylated polyurethane obtainable by reacting:

a) at least one polyol having a number average molecular weight of from 1000 to 50,000 g/mol;
b) at least one polyisocyanate, preferably diisocyanate; and
c) at least one silicon-containing heterocycle of the general formula (I)

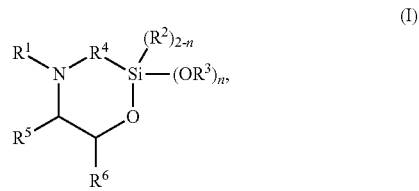

wherein $R^1$ is hydrogen;

$R^2$ and $R^3$ are same or different and are, independently from one another, selected from a linear or branched, substituted or unsubstituted $C_1$-$C_{20}$ alkyl or $C_6$-$C_{18}$ aryl residue which may be interrupted by at least one heteroatom;

$R^4$ is selected from a linear or branched, substituted or unsubstituted $C_1$-$C_{20}$ alkylene residue which may be interrupted by at least one heteroatom;

$R^5$ and $R^6$ are same or different and are, independently from one another, selected from the group consisting of hydrogen, a linear or branched, substituted or unsubstituted $C_1$-$C_{20}$ alkyl or $C_6$-$C_{18}$ aryl which may be interrupted by at least one heteroatom, and a $C_4$-$C_8$ cycloalkyl, or $R^5$ and $R^6$ may form a ring, preferably a 4- to 8-membered alkyl ring, more preferably a 5- or 6-membered alkyl ring; and n is 0, 1 or 2, preferably 2.

The present invention also provides methods for preparing a silylated polyurethane by reacting at least one polyol having a number average molecular weight of from 1000 to 50,000 g/mol, at least one polyisocyanate, and at least one silicon-containing heterocycle of the general formula (I) as defined herein.

The present invention further relates to a curable composition comprising the silylated polyurethane according to the present invention and use thereof as adhesives, sealants, spray foam and/or coatings.

The present invention also provides an adhesive, sealant, spray foam and/or coating comprising the curable composition according to the present invention.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

The term "at least one," as used herein, means 1 or more, i.e., 1, 2, 3, 4, 5, 6, 7, 8, 9, or more. With reference to an ingredient, the indication refers to the type of ingredient and not to the absolute number of molecules. "At least one polymer" thus means, for example, at least one type of polymer, i.e., that one type of polymer or a mixture of several different polymers may be used.

As used herein, the singular forms "a", "an" and "the" include both singular and plural referents unless the context clearly dictates otherwise.

The terms "comprising" and "comprises" as used herein are synonymous with "including", "includes", "containing" or "contains", and are inclusive or open-ended and do not exclude additional, non-recited members, elements or method steps.

The recitation of numerical end points includes all numbers and fractions subsumed within the respective ranges, as well as the recited end points.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The terms "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

As used herein, "$C_1$-$C_{20}$ alkyl" or "$C_1$-$C_8$ alkyl" residue refers to a monovalent group that contains from 1 to 20 or from 1 to 8 carbons atoms, that is a radical of an alkane and includes linear and branched organic groups. Examples of alkyl residues include, but are not limited to: methyl; ethyl; propyl (or n-propyl); isopropyl; n-butyl; isobutyl; sec-butyl; tert-butyl; n-pentyl; n-hexyl; n-heptyl; and, 2-ethylhexyl. In the present invention, such alkyl residues may be unsubstituted or may be substituted with one or more substituents such as halo, preferably fluoro, nitro, cyano, amido, amino, preferably tertiary amino, sulfonyl, sulfinyl, sulfanyl, sulfoxy, urea, thiourea, sulfamoyl, and sulfamide. The halogenated derivatives of the exemplary hydrocarbon radicals listed above may, in particular, be mentioned as examples of suitable substituted alkyl residues. In general, unsubstituted alkyl residues containing from 1 to 6 carbon atoms ($C_1$-$C_6$ alkyl) and unsubstituted alkyl residues containing from 1 to 4 carbon atoms ($C_1$-$C_4$ alkyl) are preferred.

The term "$C_4$-$C_8$ cycloalkyl" is understood to mean a saturated, mono- or bicyclic hydrocarbon residue having from 4 to 8 carbon atoms. Examples of cycloalkyl residues include, but are not limited to: cyclopropyl; cyclobutyl; cyclopentyl; cyclohexyl; cycloheptyl; cyclooctyl; and norbornane.

As used herein, an "$C_6$-$C_{18}$ aryl" residue is used alone or as part of a larger moiety—as in "aralkyl residue"-refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl residues include, but are not limited to: phenyl; indenyl; naphthalenyl, tetrahydronaphthyl, tetrahydroindenyl; tetrahydroanthracenyl; and, anthracenyl. A phenyl residue is preferred.

The term "$C_1$-$C_{20}$ alkylene" or "$C_1$-$C_8$ alkylene" residue refers to a divalent group that contains from 1 to 20 or 1 to 8 carbon atoms, that is a radical of an alkane and includes linear, branched organic or cyclic groups, which groups may be unsubstituted or substituted and may optionally be interrupted by at least one heteroatom.

Where mentioned, the expression "interrupted by at least one heteroatom" means that the main chain of a residue comprises, as a chain member, at least one atom that differs from carbon atom, preferably selected from oxygen, sulfur, or nitrogen.

In a first aspect, the present invention provides a silylated polyurethane obtainable by reacting:
a) at least one polyol having a number average molecular weight of from 1000 to 50,000 g/mol;
b) at least one polyisocyanate, preferably diisocyanate; and
c) at least one silicon-containing heterocycle of the general formula (I)

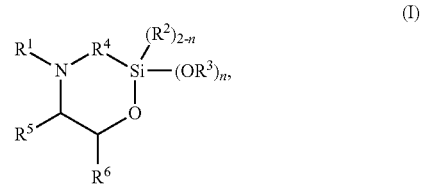

wherein $R^1$ is hydrogen;
$R^2$ and $R^3$ are same or different and are, independently from one another, selected from a linear or branched, substituted or unsubstituted $C_1$-$C_{20}$ alkyl or $C_6$-$C_{18}$ aryl residue which may be interrupted by at least one heteroatom;
$R^4$ is selected from a linear or branched, substituted or unsubstituted $C_1$-$C_{20}$ alkylene residue which may be interrupted by at least one heteroatom;
$R^5$ and $R^6$ are same or different and are, independently from one another, selected from the group consisting of hydrogen, a linear or branched, substituted or unsubstituted $C_1$-$C_{20}$ alkyl or $C_6$-$C_{18}$ aryl which may be interrupted by at least one heteroatom, and a $C_4$-$C_8$ cycloalkyl, or $R^5$ and $R^6$ may form a ring, preferably a 4- to 8-membered alkyl ring, more preferably a 5- or 6-membered alkyl ring; and n is 0, 1 or 2, preferably 2.

A "polyol" is understood for purpose of the present invention as a polymer having at least two hydroxyl groups. In principle, a large number of polymers carrying at least two hydroxyl groups, such as polyester polyols, polycaprolactones, polybutadienes or polyisoprenes as well as hydrogenation products thereof, or also polyacrylates or polymethacrylates, can be used as polyol. Mixtures of different polyols can also be used.

According to the present invention, a polyether polyol is preferably used as the polyol. A "polyether" is understood for purpose of the present invention as a polymer whose repeating unit contains ether functionalities C—O—C in the main chain. Polymers having lateral ether groups, such as cellulose ethers, starch ethers, and vinyl ether polymers, as well as polyacetals, are therefore not covered by this definition.

Polymers which contain polyethers as backbone have a flexible and elastic structure with which compositions that have outstanding elastic properties can be manufactured. Polyethers are not only flexible in their backbone, but also strong at the same time. Thus, for example, polyethers (in contrast to e.g., polyesters) are not attacked or decomposed by water and bacteria.

In preferred embodiments of the present invention, the polyol is a polyoxyalkylene, in particular polyethylene oxide and/or polypropylene oxide.

Polyethers that have been modified by vinyl polymers are also suitable for use as a polyol component. Products such as these are obtainable, for example, by polymerizing styrene and/or acrylonitrile, or a mixture thereof, in the presence of polyethers.

In preferred embodiments of the present invention, the polyol has a polydispersity (PD) of less than 2, preferably less than 1.5, and more preferably less than 1.3.

The number average molecular weight $M_n$, is understood as the arithmetically averaged molecular weight of the polymer. The number average molecular weight $M_n$, as well as the weight average molecular weight $M_w$, is determined by gel permeation chromatography (GPC, also known as SEC) with tetrahydrofuran (THF) as the eluent according to DIN 55672-1:2007-08, preferably at 35° C. This method is known to one skilled in the art. The polydispersity is derived from the average molecular weights $M_w$ and $M_n$. It is calculated as $PD=M_w/M_n$.

The ratio $M_w/M_n$, also referred to as "polydispersity," indicates the width of the molecular weight distribution and thus the differing degrees of polymerization of the individual chains in polydisperse polymers. For many polymers and polycondensates, the applicable polydispersity value is approximately 2. Strict monodispersity would exist for a value of 1. A low polydispersity (for example, less than 1.5) indicates a comparatively narrow molecular weight distribution and thus the specific expression of properties associated with molecular weight, for example viscosity.

Particularly advantageous viscoelastic properties can be achieved if polyoxyalkylene polymers that possess a narrow molecular weight distribution, and therefore a low polydispersity, are used as polymeric backbones. These can be manufactured, for example, by so-called double metal cyanide catalysis (DMC catalysis). These polyoxyalkylenepolymers are notable for a particularly narrow molecular weight distribution, a high average molecular weight, and a very small number of double bonds at the ends of the polymer chains. Polyoxyalkylene polymers of this kind have a polydispersity PD of at most 1.7.

Particularly preferred organic backbones are, for example, polyethers having a polydispersity from approximately 1.01 to approximately 1.3, in particular approximately 1.05 to approximately 1.18, for example approximately 1.08 to approximately 1.11.

In preferred embodiments of the present invention, the polyol has a number average molecular weight ($M_n$) of from 1000 to 50,000 g/mol, preferably from 4000 to 30,000 g/mol, more preferably from 4000 to 25,000 g/mol. Polyether polyol having a number average molecular weight of from 4,000 to 22,000, in particular of from 4,000 to 20,000 g/mol, are particularly preferred.

In certain embodiments of the present invention, the polyol has a number average molecular weight ($M_n$) of from 12,000 to 18,000 g/mol is particularly preferred.

Mixtures of multiple polymers having different molecular weights, can also be used according to the present invention instead of pure polymers. In this case the statements with regard to polydispersity and molecular weight, are to be understood in such a way that, advantageously, each of the polymers on which the mixture is based exhibits a polydispersity in the preferred range, but the preferred molecular weight ranges refer to the value averaged over the entire mixture of the polymers that are used.

Commonly used polymers are polyoxymethylene homo- and copolymers, polyurethanes, vinyl butyrates, vinyl polymers, e.g. polymers containing vinyl chloride and/or vinyl acetate, rayon, ethylene copolymers such as e.g. ethylene-vinyl acetate copolymers, ethylene-acrylic acid copolymers, ethylene-acrylate copolymers, organic rubbers, mixtures of different silylated polymers, such that the backbone can also contain silyl groups. Examples include polyethers based on ethylene oxide, propylene oxide, and tetrahydrofuran, polyacrylate, and polymethacrylate. Of the aforesaid polymer backbones, polyethers and polyurethanes are preferred. Polyethers based on polyethylene oxide and/or polypropylene oxide, in particular polypropylene glycol, are particularly preferred. Polymers that contain polyethers as a backbone exhibit a flexible and elastic structure in the polymer backbone. Compositions that exhibit outstanding elastic properties can be manufactured therewith. Polyethers are not only flexible in their framework, but also at the same time strong. For example, they are not attacked or decomposed by water and bacteria and are therefore notable for relative stability (in contrast to polyesters) with respect to environmental influences. The polymer, made up of an organic backbone having carbon atoms in the main chain, contained in the silane-crosslinking adhesive or sealant according to the present invention, does not include inorganic polymers such as, for example, polyphosphates, polysilanes, polysiloxanes, polysulfides. The advantage of the embodiment according to the present invention, in particular of the use of polyurethanes and polyethers, as compared with silicone-based binders or other inorganic polymers, is good adhesion to a very wide variety of substrates, good spreadability, no contamination of the substrate with silicones, and the highly elastic framework structure.

The polyisocyanates suitable for the present invention are preferably diisocyanate or triisocyanate, more preferably diisocyanate. They can be selected from ethylene diisocyanate, 1,4-tetramethylene diisocyanate, 1,4-tetramethoxybutane diisocyanate, 1,6-hexamethylene diisocyanate (HDI), cyclobutane 1,3-diisocyanate, cyclohexane 1,3- and 1,4-diisocyanate, bis (2-isocyanatoethyl) fumarate, as well as mixtures of two or more thereof, 1-isocyanato-3,3,5-trimethyl-5-isocyanatomethylcyclohexane (isophorone diisocyanate, IPDI), 2,4- and 2,6-hexahydrotoluoylene diisocyanate, hexahydro-1,3- or -1,4-phenylene diisocyanate, benzidine diisocyanate, naphthalene 1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluoylene diisocyanate (TDI), 2,4'-diphenylmethane diisocyanate, 2,2'-diphenylmethane diisocyanate, or 4,4'-diphenylmethane diisocyanate (MDI), or partially or completely hydrogenated cycloalkyl derivatives thereof, for example completely hydrogenated MDI (H12-MDI), alkyl-substituted diphenylmethane diisocyanates, for example mono-, di-, tri-, or tetraalkyldiphenylmethane diisocyanate as well as partially or completely hydrogenated cycloalkyl derivatives thereof, 4,4'-diisocyanatophenylperfluorethane, phthalic acid bisisocyanatoethyl ester, 1-chloromethylphenyl-2,4- or -2,6-diisocyanate, 1-bromomethylphenyl-2,4- or -2,6-diisocyanate, 3,3-bis-chloromethylether-4,4'-diphenyldiisocyanate, sulfur-containing diisocyanates such as those obtainable by reacting 2 mol diisocyanate with 1 mol thiodiglycol or dihydroxyhexylsulfide, the di- and triisocyanates of the di- and trimer fatty acids, or mixtures of two or more of the aforesaid diisocyanates. It is also possible to use as polyisocyanates trivalent or higher-valence isocyanates such as those obtainable, for example, by oligomerization of diisocyanates, in particular by oligomerization of the aforementioned isocyanates. Examples of such trivalent and higher-valence polyisocyanates are the triisocyanurates of HDI or IPDI or mixtures thereof, or mixed triisocyanurates thereof, as well as polyphenylmethylene polyisocyanate as obtainable by phosgenation of aniline-formaldehyde condensation products.

In the general formula (I)

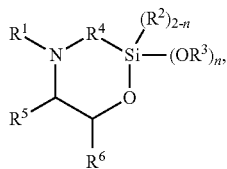

(I)

$R^1$ is hydrogen; $R^2$ and $R^3$ are same or different and are, independently from one another, selected from a linear or branched, substituted or unsubstituted $C_1$-$C_{20}$ alkyl or $C_6$-$C_{18}$ aryl residue, preferably selected from a $C_1$-$C_8$ alkyl residue, more preferably a methyl, ethyl or propyl residue, which may be interrupted by at least one heteroatom; $R^4$ is selected from a linear or branched, substituted or unsubstituted $C_1$-$C_{20}$ alkylene residue, preferably a $C_1$-$C_8$ alkylene, more preferably a methylene, ethylene, 1,3-propylene, 2-methyl-1,3-propylene, or 1,4-butylene residue, most preferably a methylene or 1,3-propylene residue, in particular a 1,3-propylene residue, which may be interrupted by at least one heteroatom; $R^5$ and $R^6$ are same or different and are, independently from one another, selected from the group consisting of hydrogen, a linear or branched, substituted or unsubstituted $C_1$-$C_{20}$ alkyl or $C_6$-$C_{18}$ aryl, preferably $C_1$-$C_8$ alkyl residue or a phenyl residue, which may be interrupted by at least one heteroatom, and a $C_4$-$C_8$ cycloalkyl, or $R^5$ and $R^6$ may form a ring, preferably a 4- to 8-membered alkyl ring, more preferably a 5- or 6-membered alkyl ring; and n is 0, 1 or 2, preferably 2.

In preferred embodiments, in the general formula (I), $R^1$ is hydrogen; $R^2$ is selected from a linear or branched, substituted or unsubstituted $C_1$-$C_8$ alkyl residue; $R^3$ is selected from a linear or branched, substituted or unsubstituted $C_1$-$C_8$ alkyl residue; $R^4$ is selected from a linear or branched, substituted or unsubstituted $C_1$-$C_8$ alkylene residue; and/or $R^5$ is selected from hydrogen and a linear or branched, substituted or unsubstituted $C_1$-$C_8$ alkyl residue while $R^6$ is selected from a linear or branched, substituted or unsubstituted $C_1$-$C_8$ alkyl residue or a phenyl, or $R^5$ and $R^6$ form a 4- to 8-membered alkyl ring, in particular a 5- or 6-membered alkyl ring.

More preferably, in the general formula (I), n is 2; $R^1$ is hydrogen; $R^3$ is selected from a methyl, ethyl or propyl residue, most preferably a methyl residue; $R^4$ is selected from a methylene, ethylene, 1,3-propylene, 2-methyl-1,3-propylene, or 1,4-butylene residue, more preferably a methylene or 1,3-propylene residue, most preferably a 1,3-propylene residue; $R^5$ is hydrogen; and/or $R^6$ is selected from a linear or branched, substituted or unsubstituted $C_1$-$C_8$ alkyl residue or phenyl residue, or $R^5$ and $R^6$ form a 5- or 6-membered alkyl ring.

A preferred silicon-containing heterocycle of the general formula (I) for use in the present invention is selected from the group consisting of:

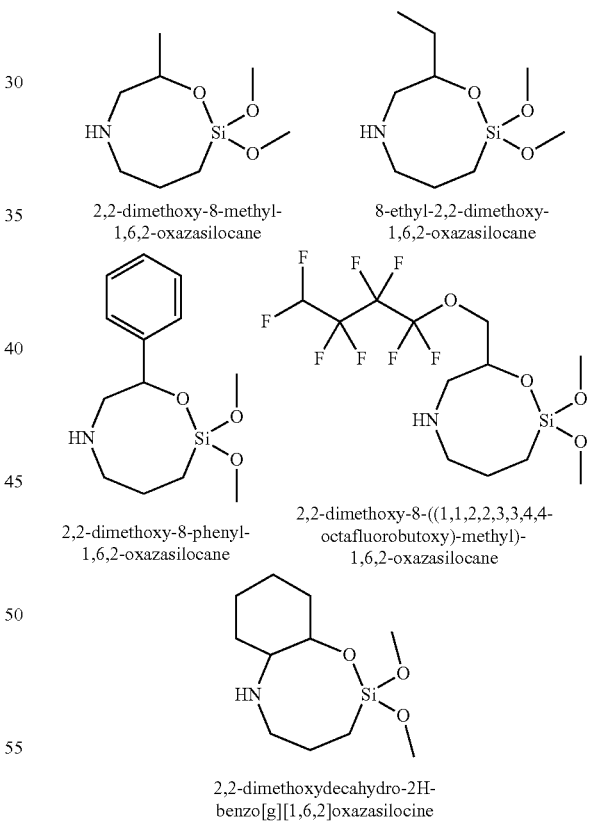

2,2-dimethoxy-8-methyl-1,6,2-oxazasilocane 8-ethyl-2,2-dimethoxy-1,6,2-oxazasilocane 2,2-dimethoxy-8-phenyl-1,6,2-oxazasilocane 2,2-dimethoxy-8-((1,1,2,2,3,3,4,4-octafluorobutoxy)-methyl)-1,6,2-oxazasilocane 2,2-dimethoxydecahydro-2H-benzo[g][1,6,2]oxazasilocine In preferred embodiments, the silylated polyurethane according to the present invention has a viscosity of from 5 to 1000 Pa·s, preferably from 5 to 500 Pa·s, more preferably from 5 to 100 Pa·s, measured at 25° C. by Anton Paar MCR 302 Rheometer in neat conditions using PP25/TG stirring plate.

The silicon-containing heterocycle compound of the general formula (I) is obtainable by a one-step reaction of at least one epoxide compound of the general formula (II) and at least one aminoalkoxysilane having a primary amino group in the presence of a catalyst

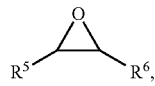

(II)

wherein $R^5$ and $R^6$ are the same as defined for the general formula (I) above.

Examples of the epoxide of the general formula (II) include, but are not limited to: ethylene oxide, propylene oxide, 1,2-epoxybutane, 1,2-epoxyhexane, 1,2-epoxydodecane, cyclohexyl oxirane, n-butyl glycidyl ether, tert-butyldimethylsilyl glycidyl ether, benzyl glycidyl ether, 10,11-epoxyundecan-1-ol, 4,5-epoxypentyl butyrate, 5,6-epoxyhexanenitrile, N,N-dimethyl-10,11-undecylamide, 1,2-epoxy-5-hexene, 1,2-epoxy-7-octene, (2,3-epoxypropyl)benzene, styrene oxide, and 1,2,7,8-diepoxyoctane, chloro-2,3-epoxypropane, 1-fluoro-2,3-epoxypropane, l-bromo-2,3-epoxypropane, 1-chloro-2,3-epoxy butane and 1-chloro-2,3-epoxy pentane, 1,3-Butadiene diepoxide, allyl glycidyl ether, 1,4-butanediol diglycidyl ether, 1,4-butanediol diglycidyl ether, butyl glycidyl ether, tert-butyl glycidyl ether, 4-chlorophenyl glycidyl ether, 1,4-cyclohexanedimethanol diglycidyl ether, 1,2,5,6-diepoxycyclooctane, 1,2,7,8-diepoxyoctane, 2,3-epoxybutane, 3,4-epoxy-1-butene, 1,2-epoxy-5-hexene, 2,3-epoxy-2-methylbutane, 1,2-epoxy-2-methylpropane, exo-2,3-epoxynorbornane, 1,2-epoxyoctane, 1,2-epoxypentane, 1,2-epoxy-3-phenoxypropane, 1,2-epoxy-3-phenoxypropane, 1,2-epoxytetradecane, furfuryl glycidyl ether, glycidyl 2,2,3,3,4,4,5,5,6,6,7,7,8,8,9,9-hexadecafluorononyl ether, glycidyl hexadecyl ether, glycidyl isobutyl ether, glycidyl isopropyl, glycidyl 4-methoxyphenyl, glycidyl 2-methylphenyl ether, glycidyl 2,2,3,3,4,4,5,5-octafluoropentyl, glycidyl 2,2,3,3-tetrafluoropropyl, (2,2,3,3,4,4,5,5,6,6,7,7,8,8,9,9,9-heptadecafluorononyl) oxirane, (2,2,3,3,4,4,5,5,6,6,7,7,8,9,9,9-hexadecafluoro-8-(trifluoromethyl)nonyl) oxirane, isophorone oxide, methyl-1,2-cyclopentene oxide, 2-methyl-2-vinyloxirane, 2,2,3,3,4,5,5,5-octafluoro-4-(trifluoromethyl)pentyl]oxirane.

In preferred embodiments, the aminoalkoxysilane used in preparing silicon-containing heterocycle of the general formula (I) has the general formula (III)

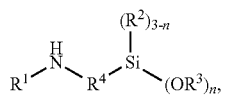

(III)

wherein, $R^1$ to $R^4$ are the same as defined for the general formula (I) above; and n is 0, 1, 2 or 3, preferably 3.

Preferably, the aminosilane is aminoalkylenealkoxysilane. More preferably, the aminoalkylenealkoxysilane is selected from the group consisting of gamma-aminopropyltrimethoxysilane, gamma-aminopropyltriethoxysilane, gamma-aminopropylmethyldiethoxysilane, gamma-aminopropylmethyldimethoxysilane, gamma-aminopropyltriisopropoxysilane, gamma-aminopropylmethyldiisopropoxysilane, alpha-aminomethyltriethoxysilane, alpha-aminomethyltrimethoxysilane, alpha-aminomethyldiethoxymethylsilane, alpha-aminomethyldimethoxymethylsilane, alpha-aminomethyltriisopropoxysilane, alpha-aminomethyldiisopropoxymethylsilane, gamma-aminopropylsilanetriol, gamma-aminopropylmethylsilanediol or mixtures thereof.

The synthesis of silicon-containing heterocycles of the general formula (I) may be conducted at a broad range of temperatures, e.g., from −100 to 50° C., preferably from 0 to 50° C., more preferably from 0 to 35° C., most preferably from 10 to 25° C. such as at a room temperature.

In preferred embodiments, the at least one epoxide is added in stoichiometric amounts or in an excess ranging from 1 to 200%, preferably from 10 to 100%, more preferably 50%, with respect to the amino groups of the aminoalkoxysilane(s). The unreacted epoxides are removed after the reaction using high vacuum.

In preferred embodiments, the reaction is carried out in at least one neat or in dry solvent. Examples of the solvents include, but are not limited to: toluene, acetonitrile, tetrahydrofuran, ethylene glycol, diethyl ether, dimethyl ether, benzene, ethyl acetate, isopropanol, propanol, ethanol, methanol, chloroform, chloromethane, dichloromethane, pentane, hexane, heptane, cyclohexane, isooctane, toluene, xylene, dioxane, butyl acetate, acetonitrile or dimethylformamide. Mixtures of different solvents can also be used.

Reaction times may vary from 0.5 to 96 hours, preferably from 2 to 48 hours.

The one-step reaction for preparing the silicon-containing heterocycle of the general formula (I) is carried out in the presence of a catalyst. Examples of the catalyst include, but are not limited to: Lewis acid or base catalysts or Brønsted-Lowry acid or base catalysts or a combination thereof. Preferably, Lewis acid catalysts, more preferably weak Lewis acid catalysts can be used.

The term "Lewis acid" as used herein refers to any electrophilic reagent that is capable of accepting an electron pair, but not a proton like it is in the case of Brønsted-Lowry acid.

The term "week Lewis acid" as used herein refers to an electron pair acceptor which forms a strong conjugate base. The acidity of a metal based Lewis acids decrease with a growing a metal radius (e. g. Al>Fe>Ca). Therefore the term weak Lewis acid is associated to the acids containing elements like Ca, Mg, Na, etc. The week Lewis acid shows a pKa value of ≥8 (Jander et al., *Maßanalyse: Theorie und Praxis der Titrationen mit chemischen und physikalischen Indikationen*. 16th Edition. Walter de Gruyter, 2003).

In certain embodiments, the Lewis acid portion of the catalyst includes an element selected from Groups 1 to 14 of the Periodic Table or contains a lanthanide metal. Useful Lewis acids may either be neutral (e.g., compounds such as $AlCl_3$, $CrCl_2$, $CrCl_3$, $ZnCl_2$, $BF_3$, $BCl_3$, $Yb(OTf)_3$, $FeCl_2$, $FeCl_3$, $CoCl_2$, etc.) or cationic. A broad array of metallic Lewis acids have been found be applicable in the present invention. In certain embodiments, metal is an alkaline earth metal of Group 2, such as magnesium, calcium, beryllium, strontium. In particular organocalcium, organomagnesium, organostrontium or organoberyllium compounds are preferred, wherein these metal catalysts comprise preferably alkoxy groups, sulfonate groups, carboxyl groups, dialkyl phosphate groups, dialkyl pyrophosphate groups and/or diketonate groups.

Particularly suitable catalyst is selected from calcium bistrifluoroacetate, calcium bisacetate, calcium bispivalate, calcium bisisobutyrane, calcium bispropionate, calcium acetate, calcium benzoate, calcium cyclohexanecarboxylate, calcium 2,2-difluoroacetate, calcium 2-fluoroacetate, calcium 2-chloroacetate, calcium methyl carbonate, magnesium bistrifluoroacetate, magnesium bisacetate, magnesium bispivalate, magnesium bisisobutyrane, magnesium bispropionate, magnesium acetate, magnesium benzoate, magnesium cyclohexanecarboxylate, magnesium 2,2-difluoroacetate, magnesium 2-fluoroacetate, magnesium 2-chloroacetate, and magnesium methyl carbonate.

Transition metals can also be used in the reaction according to the present invention. For example, in certain embodiments, the transition metal is aluminum, chromium, indium or gallium.

In certain embodiments, an organotitanate is used as the catalyst. Examples of the organotitante include, but are not limited to: titanium(IV) complex compounds with two 1,3-diketonate ligands, in particular 2,4-pentane dionate (acetylacetonate), and two alcoholate ligands; titanium(IV) complex compounds with two 1,3-ketoesterate ligands, in particular ethyl acetoacetate, and two alcoholate ligands; titanium(IV) complex compounds with one or more amino alcoholate ligands, in particular triethanolamine or 2-((2-aminoethyl)amino)ethanol, and one or more alcoholate ligands; titanium(IV) complex compounds with four alcoholate ligands; as well as more highly condensed organotitanates, in particular oligomeric titanium(IV) tetrabutanolate, also referred to as polybutyl titanate; wherein, as alcoholate ligands, isobutoxy, n-butoxy, isopropoxy, ethoxy and 2-ethylhexoxy are particularly suitable. Most particularly suitable are bis(ethylacetoacetato)diisobutoxytitanium (IV), bis(ethylacetoacetato)diisopropoxytitanium (IV), bis(acetylacetonato)diisopropoxytitanium (IV), bis(acetylacetonato)diisobutoxytitanium (IV), tris(oxyethyl) amineisopropoxytitanium (IV), bis[tris(oxyethyl)amine] diisopropoxytitanium(IV), bis(2-ethythexane-1,3-dioxy) titanium(IV), tris[2-((2-aminoethyl)amino)ethoxy] ethoxytitanium(IV), bis(neopentyl(diallyl) oxydiethoxytitanium(IV), titanium(IV) tetrabutanolate, tetra-(2-ethylhexyloxy)titanate, tetra-(isopropoxy)titanate and polybutyltitanate. Particularly suitable are the commercially available types Tyzor® AA, GBA, GBO, AA-75, AA-65, AA-105, DC, BEAT, BTP, TE, TnBT, KTM, TOT, TPT or IBAY (all from Du Pont/Dorf Ketal); Tytan PBT, TET, X85, TAA, ET, S2, S4 or S6 (all from TensoChema) and Ken-React® KR® TTS, 7, 9QS, 12, 26S, 33DS, 38S, 39DS, 44, 134S, 138S, 133DS, 158FS or LICA® 44 (all from Kenrich Petrochemicals).

Nitrogen-containing Lewis or Brønsted-Lowry bases can also be used. Examples of these catalysts include, but are not limited to: 1,4-diazabicyclo[2.2.2]octane, N,N,N',N'-tetramethyl alkylenediamines, polyoxyalkylenamines, triethylamine, tripropylamine, trimethylamine, as well as amidines, such as, in particular, 6-dibutylamino-1,8-diazabicyclo [5.4.0]undec-7-ene, 1,8-diazabicyclo[5.4.0]undec-7-ene (DBU), 1,5-diazabicyclo[4.3.0]non-5-ene (DBN); guanidines such as, in particular, tetramethylguanidine, acetylacetoneguanidine, 2-guanidinobenzimidazole, 2-tert.butyl-1,1, 3,3-tetramethylguanidine, 1,3-di-o-tolylguanidine.

The catalyst can be added up to 10 mol %, preferably from 0.01 to 10 mol %, more preferably from 0.5 to 5 mol %, most preferably from 1 to 2.5 mol %, relative to the mol % of the amine functionality of the aminoalkoxysilane.

In another aspect the present invention provides a method for preparing a silylated polyurethane by reacting:
  a) at least one polyol having a number average molecular weight of from 1000 to 50,000 g/mol;
  b) at least one polyisocyanate, preferably diisocyanate; and
  c) at least one silicon-containing heterocycle of the general formula (I)

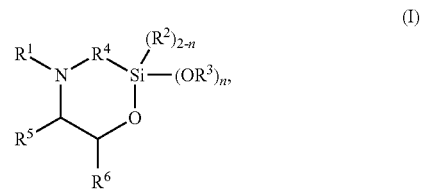

wherein $R^1$ to $R^6$ and n are the same as defined above for the general formula (I).

The silicon-containing heterocycle of the general formula (I) can be added to NCO-terminated prepolymer(s) or can be blended with polyisocyanate(s) prior to the reaction with polyol(s).

In preferred embodiments of the present invention, the silylated polyurethane is obtainable by
  (a) reacting at least one polyol having a number average molecular weight of from 1000 to 50,000 g/mol with at least one polyisocyanate, preferably diisocyanate, with a stoichiometric excess of the NCO group of the polyisocyanate(s) with respect to the OH group of the polyol(s) to form a NCO-terminated polyurethane prepolymer; and
  (b) reacting said NCO-terminated polyurethane prepolymer with at least one silicon-containing heterocycle of the general formula (I)

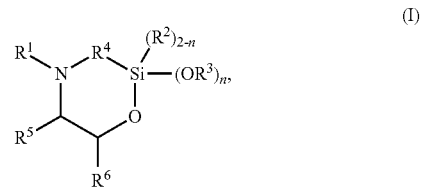

wherein $R^1$ to $R^6$ and n are the same as defined above for the general formula (I).

According to the above-described preferred embodiments of the present invention, a stoichiometric excess of the NCO group of the polyisocyanate(s) with respect to the OH group of the polyol(s) used is preferably equal to 1.01 to 2.0, more preferably 1.05 to 1.5.

This ensures that NCO-terminated polyurethane prepolymers are formed as a reaction product.

The thereby obtained NCO-terminated polyurethane prepolymer is then reacted with at least one silicon-containing heterocycle of the general formula (I) to obtain the silylated polyurethane according to the present invention, which preferably comprises alkoxysilyl groups as reactive end groups. This requires that at least one molecule of the silicon-containing heterocycle of the general formula (I) be used for each isocyanate group of the polyurethane prepolymer. Preferably, the silicon-containing heterocycle of the general formula (I) is used at a slight stoichiometric excess.

The above-described embodiments can be performed under the following conditions. In the first step at least one polyol and at least one isocyanate functional compound (polyisocyanate) are mixed together for 0.5 to 5 hours at temperature from −10 to 150° C., preferably from 25 to 100° C. In the second step at least one silicon-containing heterocycle of the general formula (I) is added as endcapper. Suitable reaction temperature is in a range between −10 and 150° C., preferably between 25 and 100° C., more preferably between 60 and 90° C. Reaction time largely depends on the selected isocyanate functional compound, endcapper and catalyst employed and is in range from 1 to 72 hours, preferably from 6 to 12 hours. The above reactions are usually preformed without using a solvent. However, in case of high viscosity of the reaction mixture, solvents can be used. Useful solvents are acetone, butanone, ethyl acetate, toluene, acetonitrile, tetrahydrofuran and ethylene glycol dimethyl ether, hexane, heptane, pentane, cyclohexane and benzene.

In alternative embodiments of the present invention, the silylated polyurethane is obtainable by
(a) reacting at least one polyisocyanate, preferably diisocyanate, with at least one silicon-containing heterocycle of the general formula (I)

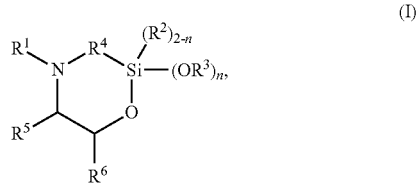

wherein $R^1$ to $R^6$ and n are the same as defined above for the general formula (I), with a stoichiometric excess of the NCO group of the polyisocyanate(s) with respect to the amino group of the silicon-containing heterocycle(s) of the general formula (I); and
(b) reacting the reaction product obtained in step (a) with at least one polyol having a number average molecular weight of from 1000 to 50,000 g/mol.

According to the above-described alternative embodiments of the present invention, a stoichiometric excess of the NCO group of the polyisocyanate(s) with respect to the amino group of the silicon-containing heterocycle(s) of the general formula (I) used is preferably equal to 1.1 to 3.0, more preferably 1.5 to 2.5.

The above-described alternative embodiments can be performed under the following conditions. In the first step, at least one silane compound of the general formula (I) and at least one isocyanate functional compound (polyisocyanate) are mixed together for 0.1 to 5 hours at temperature from −10 to 150° C., preferably from 0 to 80° C. In the second step at least one polyol is added to the NCO-terminated endcapper. Suitable reaction temperature is in a range between −10 and 150° C., preferably between 25 and 100° C., more preferably between 60 and 90° C. Reaction time largely depends on the selected isocyanate functional compound, endcapper and catalyst employed and is in range from 1 to 72 hours, preferably from 6 to 12 hours. The reaction for forming a NCO-terminated endcapper is usually preformed without using a solvent. However, in cases of high viscosity of the reaction mixture, solvents can be used. Useful solvents are acetone, butanone, ethyl acetate, toluene, acetonitrile, tetrahydrofuran and ethylene glycol dimethyl ether, hexane, heptane, pentane, cyclohexane and benzene.

Alternatively, the silylated polyurethane according to the present invention is obtainable by one-pot synthesis by blending at least one polyol having a number average molecular weight of from 1000 to 50,000 g/mol, at least one polyisocyanate, preferably diisocyanate, and at least one silicon-containing heterocycle of the general formula (I) as described herein.

The reaction progress can be monitored using infrared spectroscopy (IR). A complete disappearance of the NCO stretching around 2260 $cm^{-1}$, while the growth of the carbonyl peak around 1700 $cm^{-1}$ indicates that reaction is completed.

In certain embodiments according to the present invention, aforementioned methods for preparing a silylated polyurethane further comprises a step of adding at least one catalyst.

Suitable catalysts are organometallic Lewis acids like iron or tin compounds, in particular the 1,3-dicarbonyl compounds of iron or of di- or tetravalent tin, tin(II) carboxylates or dialkyltin(IV) dicarboxylates, or the corresponding dialkoxylates, e.g., dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diisooctylmaleate, dibutyltin ditridecylmaleate, dibutyltin dibenzylmaleate, dibutyltin maleate, dibutyltin diacetate, tin (II) octaoate, tin(II) phenolate, dioctyltin distearate, dioctyltin dilaurate (DOTL), dioctyltin dimethylmaleate, dioctyltin diethylmaleate, dioctyltin dibutylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide, reaction products between dibutyltin oxides and phthalic acid esters, or the acetylacetonates of di- or tetravalent tin.

It is also possible to use alkyl titanates, such as tetrabutyl titanate and tetrapropyl titanate, organoaluminum compounds such as aluminum trisacetylacetonate, aluminum trisethylacetoacetate, and diisopropoxyaluminum ethylacetoacetate, chelate compounds such as zirconium tetraacetylacetonate and titanium tetraacetylacetonate, lead octanoate, organosilicon titanium compounds, or bismuth tris-2-ethylhexanoate, acid compounds such as phosphoric acid, p-toluenesulfonic acid, or phthalic acid, aliphatic amines such as butylamine, hexylamine, octylamine, decylamine, or laurylamine, aliphatic diamines such as, ethylenediamine, hexyldiamine, or also aliphatic polyamines such as diethylenetriamine, triethylenetetramine, tetraethylenepentamine, heterocyclic nitrogen compounds, e.g. piperidine, piperazine, aromatic amines such as m-phenylenediamine, ethanolamine, triethylamine, and so one.

Also suitable are the following tin compounds: di(n-butyl)tin(IV) sulfide, di(n-butyl)tin(IV) oxide, di(n-octyl)tin(IV) oxide, (n-butyl)$_2$Sn(SCH$_2$COO), (n-octyl)$_2$Sn(SCH$_2$COO), (n-octyl)$_2$Sn(SCH$_2$CH$_2$COO), (n-octyl)$_2$Sn(SCH$_2$CH$_2$COOCH$_2$CH$_2$OCOCH$_2$S), (n-butyl)$_2$Sn(SCH$_2$COO-i-C$_8$H$_{17}$)$_2$, (n-octyl)$_2$Sn(SCH$_2$COO-i-C$_8$H$_{17}$)$_2$, (n-octyl)$_2$Sn(SCH$_2$COO-n-C$_8$H$_{17}$)$_2$.

Chelate-forming tin organyls can also be used, for example di(n-butyl(tin(IV) di(acetylacetonate), di(n-octyl) tin(IV) di(acetylacetonate), (n-octyl)(n-butyl)tin(IV) di(acetylacetonate).

Tin-free catalysts are also particularly preferred. Boron halides, such as boron trifluoride, boron trichloride, boron tribromide, boron triiodide, or mixed boron halides, can thus furthermore be used as curing catalysts. Boron trifluoride complexes such as, for example boron trifluoride diethyl etherate (CAS no. [109-63-71]), which, as liquids, are easier to handle than the gaseous boron halides, are particularly preferred.

In addition to other catalysts also Lewis bases can be used like: trimethylamine, triethylamine, triphenylborane, triphenylphosphine, 1,8-diazabicycloundec-7-ene (DBU), 1,5-diazabicyclo[4.3.0]non-5-ene, 1,4-diazabicyclo[2.2.2]octane, 4-dimethylaminopyridine, 1,5,7-triazabicyclo[4.4.0]dec-5-ene, 7-methyl-1,5,7-triazabicyclo[4.4.0]dec-5-ene, 1,8-bis(tetramethylguanidino)naphthalene, 2-ted-butyl-1,1,3,3-tetramethylguanidine, phosphazene base P$_4$-t-Bu, phosphazene base P$_1$-t-Bu-tris(tetramethylene), phosphazene base P$_2$-Et, phosphazene base P$_2$-t-Bu, phosphazene base P$_4$-t-Oct, phosphazene base P$_1$-t-Oct, imino-tris(dimethylamino)phosphorane, 2-tert-butylimino-2-diethylamino-1,3-dimethylperhydro-1,3,2-diazaphosphorine. Preferable catalysts are DBU and triethylamine.

In yet another aspect, the present invention provides a curable composition comprising at least one silylated polyurethane according to the present invention or obtainable by the aforementioned methods according to the present invention.

A "curable composition" is understood to be a substance or mixture of multiple substances, which is curable by physical or chemical measures. In this regard, these chemical or physical measures can be, for example, the supplying of energy in the form of heat, light, or other electromagnetic radiation, but also simply bringing into contact with atmospheric moisture, water, or a reactive component. The composition thereby changes from an original state to a state that has a higher hardness.

In preferred embodiments, the composition also contains at least one compound which has a hydrolysable silicon-containing group and a weight average molecular weight in the range of 100 to 1000 g/mol measured by GPC according to DIN 55672-1:2007-08. This compound is used as a crosslinking agent, and in addition to the hydrolysable silicon-containing group may contain further functional groups. The compound may be a silane coupling agent.

This type of coupling agent may be used as a tackifier, as an agent which influences the physical properties, as a drying agent, as a dispersion aid, or as a filler or the like. In particular, such a silane coupling agent can act as an adhesion promoter and increase the adhesion to various surfaces, for example glass, aluminum, stainless steel, zinc, copper, mortar, PVC, acrylic resins, polyester, polyethylene, polypropylene, and polycarbonate. Such a silane coupling agent may include reactive silicon-containing groups which may be defined analogously to the groups described above in conjunction with polymer component a). Alternatively, the groups may also be those of formula (IV):

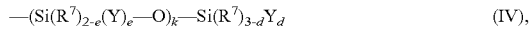

$$—(Si(R^7)_{2-e}(Y)_e—O)_k—Si(R^7)_{3-d}Y_d \qquad \text{(IV)},$$

where R$^7$ is selected from a hydrocarbon residue containing 1 to 20 carbon atoms or a triorganosiloxane group of formula —O—Si(R$^8$)$_3$, where each R$^8$ is independently selected from a hydrocarbon residue containing 1 to 20 carbon atoms; each Y is independently selected from a hydroxy group or a hydrolysable group, preferably an oxime group or alkoxy group; and k is 0, 1, or 2; e is 0, 1, or 2 and d is 0, 1, 2, or 3, where d and e are both not 0, and k is 0 or an integer from 1 to 19, where d is not 0 when k is O.

Compound of formula (IV) may contain further functional groups, including but not limited to primary, secondary, or tertiary amino groups, mercapto groups, epoxy groups, carboxyl groups, vinyl groups, isocyanate groups, isocyanurate groups, halogens, and the like.

Specific examples of these coupling agents include but are not limited to silanes containing isocyanate groups, such as gamma-isocyanate propyltrimethoxysilane, gamma-isocyanate propyltriethoxysilane, gamma-Isocyanate propylmethyldiethoxysilane, gamma-isocyanate propylmethyldimethoxysilane, (isocyanate methyl)trimethoxysilane, (isocyanate methyl)methyldimethoxysilane, (isocyanate methyl)triethoxysilane, and (isocyanate methyl)diethoxymethylsilane; silanes containing amino groups, such as gamma-aminopropyltrimethoxysilane, gamma-aminopropyltriethoxysilane, gamma-aminopropyltriisopropoxysilane, gamma-aminopropylmethyldimethoxysilane, gamma-aminopropylmethyldiethoxysilane, gamma-(2-aminoethyl)aminopropyltrimethoxysilane, gamma-(2-aminoethyl)aminopropylmethyldimethoxysilane, gamma-(2-aminoethyl)aminopropyltriethoxysilane, gamma-(2-aminoethyl)aminopropylmethyldiethoxysilane, gamma-(2-aminoethyl)aminopropyltriisopropoxysilane, gamma-(6-aminohexyl)aminopropyltrimethoxysilane, 3-(N-ethylamino)-2-methylpropyltrimethoxysilane, gamma-ureidopropyltrimethoxysilane, gamma-ureidopropyltriethoxysilane, N-phenyl-gamma-aminopropyltrimethoxysilane, N-benzyl-gamma-aminopropyltrimethoxysilane, N-vinylbenzyl-gamma-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl]ethylenediamine; silanes of the ketimine type, such as N-(1,3-dimethylbutylidene)-3-(triethoxysilyl)-1-propanamine; silanes containing mercapto groups, such as gamma-mercaptopropyltrimethoxysilane, gamma-mercaptopropyltriethoxysilane, gamma-mercaptopropylmethyldimethoxysilane, gamma-mercaptopropylmethyldiethoxysilane, mercaptomethyltrimethoxysilane, and mercaptomethyltriethoxysilane; silanes containing epoxy groups, such as gamma-glycidoxypropyltrimethoxysilane, gamma-glycidoxypropyltriethoxysilane, gamma-glycidoxypropylmethyldimethoxysilane, beta-(3,4-epoxycyclohexyl)ethyltrimethoxysilane, and beta-(3,4-epoxycyclohexyl)ethyltriethoxysilane; carboxysilanes, such as beta-carboxyethyltriethoxysilane, beta-carboxyethylphenylbis(2-methoxyethoxy)silane, and N-beta-(carboxymethyl)aminoethyl-gamma-aminopropyltrimethoxysilane, silanes containing unsaturated groups of the vinyl type, such as vinyltrimethoxysilane, vinyltriethoxysilane, gamma-methacryloyloxypropylmethyldimethoxysilane, gamma-acryloyloxypropyltriethoxysilane, and methacryloyloxymethyltrimethoxysilane; silanes containing halogen, such as gamma-chloropropyltrimethoxysilane; and isocyanurate silanes, such as tris(3-trimethoxysilylpropyl)isocyanurate. In addition, partially condensed products or reaction products of the above-mentioned silanes may be used. Aminosilanes selected from the group consisting of bis(trimethylsilyl)amine, aminopropyltriethoxysilane, aminopropyltrimethoxysilane, bis[(3-triethoxysilyl)propyl]amine, bis[(3-trimethoxysilyl)propyl]amine, aminopropylmethyldiethoxysilane, aminoethylaminopropyltrimethoxysilane, aminoethylaminopropyltriethoxysilane, 3-[2-(2-aminoethylamino)ethylamino]propyltrimethoxysilane, phenylaminomethyltrimethoxysilane, aminoethylaminopropylmethyldimethoxysilane, 3-(N-phenylamino)propyltrimethoxysilane, 3-piperazinylpropylmethyldimethoxysilane, 3-(N,N-dimethylaminopropyl)aminopropylmethyldimethoxysilane, and combinations of two or more of the above-mentioned compounds are particularly preferred within the scope of the present invention.

Examples of compounds of formula (IV) which contain no additional functional groups include tetraalkoxysilanes (tetraalkylsilicates), such as tetramethoxysilane, tetraethoxysilane, ethoxytrimethoxysilane, dimethoxydiethoxysilane, methoxytriethoxysilane, tetra-n-propoxysilane, tetra-isopropoxysilane, tetra-n-butoxysilane, tetra-isobutoxysilane, and tetra-t-butoxysilane; trialkoxysilanes, such as methyltrimethoxysilane, methyltriethoxysilane, methyltriisopropoxysilane, methyltriphenoxysilane, ethyltrimethoxysilane, butyltrimethoxysilane, and phenyltrimethoxysilane; dialkoxysilanes, such as dimethyldimethoxysilane, diethyldimethoxysilane, and diphenyldimethoxysilane; monoalkoxysilanes, such as trimethylmethoxysilane and triphenylmethoxysilane; alkylisopropenoxysilanes, such as dimethyldiisopropenoxysilane and methyltriisopropenoxysilane; and the partially hydrolyzed condensates of these silanes.

The curable composition can also contain, in addition to the aforementioned silylated polyurethane according to the present invention, adjuvants and additives, such as catalysts, plasticizers, stabilizers, antioxidants, fillers, reactive diluents, drying agents, adhesion promoters and UV stabilizers, fungicides, flame retardants, rheological adjuvants, color pigments or color pastes, and so on.

A "plasticizer" is understood as a substance that decreases the viscosity of the compositions and thus facilitates processability. Hydrophilic plasticizers serve to improve moisture uptake and thus to improve reactivity at low temperatures. Suitable as plasticizers are, for example, adipic acid esters, azelaic acid esters, benzoic acid esters, butyric acid esters, acetic acid esters; esters of higher fatty acids having approximately 8 to approximately 44 carbon atoms, esters of OH-group-carrying or epoxidized fatty acids, fatty acid esters and fats, glycolic acid esters, phosphoric acid esters, phthalic acid esters of linear or branched alcohols containing 1 to 12 carbon atoms, propionic acid esters, sebacic acid esters, sulfonic acid esters, thiobutyric acid esters, trimellitic acid esters, citric acid esters, and esters based on nitrocellulose and polyvinyl acetate, as well as mixtures of two or more thereof. The asymmetrical esters of adipic acid monooctyl ester with 2-ethylhexanol (Edenol DOA, Cognis Deutschland GmbH, Dusseldorf) are particularly suitable.

Plasticizers can be additionally used in the composition at between 0 and 40 wt %, by preference between 0 and 20 wt %, based on the total weight of the composition.

"Stabilizers" for purposes of this invention are to be understood as antioxidants, UV stabilizers, or hydrolysis stabilizers. Examples thereof are the commercially usual sterically hindered phenols and/or thioethers and/or substituted benzotriazoles and/or amines of the hindered amine light stabilizer (HALS) type. It is preferred in the context of the present invention if a UV stabilizer that carries a silyl group, and that is incorporated into the end product upon crosslinking or curing, is used. The products Lowilite 75, Lowilite 77 (Great Lakes, USA) are particularly suitable for this purpose. Benzotriazoles, benzophenones, benzoates, cyanoacrylates, acrylates, sterically hindered phenols, phosphorus, and/or sulfur can also be added.

The composition according to the present invention can contain up to 2 wt %, by preference 1 wt % of stabilizers, based on the total weight of the composition. In addition, the composition according to the present invention can further contain up to 7 wt %, in particular up to 5 wt % of antioxidants, based on the total weight of the composition.

The catalysts that can be used are all known compounds that can catalyze hydrolytic cleavage of the hydrolysable groups of the silane groupings, as well as subsequent condensation of the Si—OH group to yield siloxane groupings (crosslinking reaction and adhesion promotion function). Examples thereof are titanates such as tetrabutyl titanate and tetrapropyl titanate, tin carboxylates such as dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diisooctylmaleate, dibutyltin ditridecylmaleate, dibutyltin dibenzylmaleate, dibutyltin maleate, dibutyltin diacetate, tin octaoate, dioctyltin distearate, dioctyltin dilaurate (DOTL), dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide; reaction products between dibutyltin oxides and phthalic acid esters, dibutyltin bisacetylacetonate; organoaluminum compounds such as aluminum trisacetylacetonate, aluminum trisethylacetoacetate, and diisopropoxyaluminum ethylacetoacetate; chelate compounds such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, und 1,8-diazabicyclo-(5,4,0)-undecene-7 (DBU), a low-molecular-weight polyamide resin obtained from an excess of a polyamine and a polybasic acid, adducts of a polyamine in excess with an epoxy, silane adhesion promoters having amino groups, such as 3-aminopropyltrimethoxysilane and N-(β-aminoethyl)aminopropylmethyldimethoxysilane.

The catalyst, preferably mixtures of several catalysts, can be used in a quantity from 0.01 to 5 wt % based on the entire weight of the composition.

The composition according to the invention may additionally contain fillers. Suitable examples here are chalk, lime powder, precipitated and/or pyrogenic silicic acid, zeolites, bentonites, magnesium carbonate, diatomaceous earth, alumina, clay, talc, titanium oxide, iron oxide, zinc oxide, sand, quartz, flint, mica, glass powder, and other ground mineral substances. In addition, organic fillers may also be used, in particular carbon black, graphite, wood fiber, wood flour, sawdust, cellulose, cotton, pulp, wood chips, chopped straw, and chaff. Moreover, short fibers such as glass fiber, glass filament, polyacrylonitrile, carbon fiber, Kevlar fiber, or also polyethylene fiber may be added. Powdered aluminum is likewise suitable as filler.

The pyrogenic and/or precipitated silicic acids advantageously have a BET surface area of 10 to 90 m²/g. During use, they do not cause an additional increase in the viscosity of the composition according to the invention, but contribute to strengthening of the cured composition.

It is likewise conceivable to use pyrogenic and/or precipitated silicic acids having a larger BET surface area, advantageously 100-250 m²/g, in particular 110-170 m²/g, as filler. Due to the larger BET surface area, the same effect, for example strengthening the cured composition, may be obtained at a lower weight fraction. Further substances may thus be used to improve the composition according to the invention with regard to other requirements.

Furthermore, hollow spheres having a mineral shell or a plastic shell are suitable as filler. These may be, for example, hollow glass spheres which are commercially available under the trade name Glass Bubbles®. Hollow spheres based on plastic, for example Expancel® or Dualite®, are described in EP 0520426 B1, for example. These are composed of inorganic or organic substances, each having a diameter of 1 mm or less, preferably 500 μm or less.

For some applications, fillers are preferred which impart thixotropy to the compositions. Such fillers are also described as rheological aids, for example hydrogenated castor oil, fatty acid amides, or swellable plastics such as PVC. To allow them to be easily pressed out of a suitable dosing device (a tube, for example), such compositions have a viscosity of 3000 to 15,000 mPa·s, preferably 40,000 to 80,000 mPa·s, or also 50,000 to 60,000 mPa·s.

The fillers are preferably used in a quantity of 1 to 80% by weight, based on the total weight of the composition.

Examples of suitable pigments are titanium dioxide, iron oxides, or carbon black.

In order to enhance shelf life even further, it is often advisable to further stabilize the composition according to the present invention with respect to moisture penetration using drying agents. A need occasionally also exists to lower the viscosity of the adhesive or sealant according to the present invention for specific applications, by using a reactive diluent. All compounds that are miscible with the adhesive or sealant with a reduction in viscosity, and that possess at least one group that is reactive with the binder, can be used as reactive diluents.

The following substances can be used, for example, as reactive diluents: polyalkylene glycols reacted with isocyanatosilanes (e.g. Synalox 100-50B, Dow), carbamatopropyltrimethoxysilane, alkyltrimethoxysilane, alkyltriethoxysilane, methyltrimethoxysilane, methyltriethoxysilane, and vinyltrimethoxysilane (VTMO Geniosil XL 10, Wacker), vinyltriethoxysilane, phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (10 Trimethoxy), isooctyltriethoxysilane (10 Triethoxy, Wacker), N-trimethoxysilylmethyl-O-methyl carbamate (XL63, Wacker), N-dimethoxy(methyl)silylmethyl-O-methyl carbamate (XL65, Wacker), hexadecyltrimethoxysilane, 3-octanoylthio-1-propyltriethoxysilane, and partial hydrolysates of the aforementioned compounds.

Also usable as reactive diluents are the following polymers of Kaneka Corp.: MS 5203H, MS 5303H, MS SAT 010, and MS SAX 350.

Silane-modified polymers that are derived, for example, from the reaction of isocyanatosilane with Synalox grades can likewise be used.

In the same manner, the silylated polyurethanes according to the present invention can be used in a mixture with usual polymers or prepolymers known per se, optionally with concurrent use of the aforementioned reactive diluents, fillers, and further adjuvants and additives. "Usual polymers or prepolymers" can be selected in this context from polyesters, polyoxyalkylenes, polyacrylates, polymethacrylates, or mixtures thereof; these can be free of groups reactive with siloxane groups, but optionally can also comprise alkoxysilyl groups or hydroxyl groups.

A plurality of the aforementioned silane-functional reactive diluents have at the same time a drying and/or adhesion-promoting effect in the composition. These reactive diluents may be used in quantities between 0.1 and 15 wt %, by preference between 1 and 5 wt %, based on the total weight of the composition.

Also suitable as adhesion promoters, however, are so-called tackifying agents, such as hydrocarbon resins, phenol resins, terpene-phenolic resins, resorcinol resins or derivatives thereof, modified or unmodified resin acids or resin esters (abietic acid derivatives), polyamines, polyaminoamides, anhydrides, and anhydride-containing copolymers. The addition of polyepoxide resins in small quantities can also improve adhesion on many substrates. The solid epoxy resins having a molecular weight of over 700, in finely ground form, are then preferably used for this. If tackifying agents are used as adhesion promoters, their nature and quantity depend on the adhesive/sealant composition and on the substrate onto which it is applied. Typical tackifying resins (tackifiers) such as, for example, terpene-phenolic resins or resin acid derivatives, may be used in concentrations between 5 and 20 wt %; typical adhesion promoters such as polyamines, polyaminoamides, or phenolic resins or resorcinol derivatives may be used in the range between 0.1 and 10 wt %, based on the total weight of the composition.

Unless explicitly stated otherwise, all percent values provided in conjunction with the compositions described herein refer to % by weight, in each case based on the mixture in question.

The curable composition according to the invention is produced according to known methods by intimately mixing the components in suitable dispersion units, for example a high-speed mixer.

The present invention also provides the use of the curable composition comprising the silylated polyurethane according to the present invention as adhesives, sealants, spray foam and/or coatings. A further field of application of the curable compositions according to the present invention is use as plugging, hole-filling, or spackling compound.

The compositions according to the invention are thus suitable for adhesively bonding plastics, metals, glass, ceramic, wood, wood-based materials, paper, paper-based materials, rubber, and textiles, for gluing floors, sealing building elements, windows, wall and floor coverings, and jointing in general. In this regard, the materials in each case may be adhesively bonded to themselves or with any other of the stated materials.

In principle in the present invention, all features listed within the context of the present text, particularly the embodiments, proportional ranges, components and other features of the composition according to the invention, of the method according to the invention and of the use according to the invention identified as preferred and/or special, can be implemented in all possible and not mutually exclusive combinations, with combinations of features identified as preferred and/or special also being regarded as preferred and/or special.

The following examples are used to explain the invention; however, the invention is not limited thereto.

EXAMPLES

Examples 1 to 4: 140 g (35 mmol) of polypropylene glycol of approximate number average molecular weight 4000 g/mol (OH number=28±1.5 mg KOH/g) was poured in a 250 ml three neck flask and dried under vacuum at 80° C. for 1 hour. After the vacuum was released and replaced with argon, 0.52 g (0.7 mmol) of DOTL catalyst and 16.3 g (73.5 mmol) of isophorone diisocyanate (IPDI) was added and the reaction mixture was stirred for 2 hours at the same temperature. In the second step 73.5 mmol of a silicon-containing heterocycle described in Table 1 below was added and kept stirring at 80° C. for 4 hours.

After the above-described procedure, the sample was collected and analyzed in IR spectrometer. No bands for NCO groups were at 2260 $cm^{-1}$ observed, meaning that all of the NCO groups were reacted.

Comparative Example 1: 140 g (35 mmol) of polypropylene glycol of approximate number average molecular weight 4000 g/mol (OH number=28 mg KOH/g) was poured in a 250 ml three neck flask and dried under vacuum at 80° C. for 1 hour. After the vacuum was released and replaced with argon, 0.52 g (0.7 mmol) of DOTL catalyst and 16.3 g (73.5 mmol) of isophorone diisocyanate (IPDI) was added and the reaction mixture was stirred for 2 hours at the same temperature. In the second step 13.16 g (73.5 mmol) of 3-aminopropyltrimethoxysilane was added and kept stirring at 80° C. for 3 hours. After the above-described procedure, the sample was collected and analyzed in IR spectrometer. No bands for NCO groups at 2260 cm$^{-1}$ were observed, meaning that all of the NCO groups were reacted.

The viscosity of the obtained prepolymers after the endcapping was measured at 25° C. by Anton Paar MCR 302 Rheometer in neat conditions using PP25/TG stirring plate.

TABLE 1

| Prepolymer | Endcapper | Viscosity (Pa · s) |
|---|---|---|
| Comp. Ex. 1 | 3-aminopropyltrimethoxysilane | 64.96 |
| Ex. 1 | 2,2-dimethoxy-8-methyl-1,6,2-oxazasilocane | 34.58 |
| Ex. 2 | 8-ethyl-2,2-dimethoxy-1,6,2-oxazasilocane | 42.46 |
| Ex. 3 | 2,2-dimethoxy-8-phenyl-1,6,2-oxazasilocane | 55.43 |
| Ex. 4 | 2,2-dimethoxy-8-((1,1,2,2,3,3,4,4-octafluorobutoxy)-methyl)-1,6,2-oxazasilocane | 52.78 |

Examples 5 and 6: 140 g (12.5 mmol) of polypropylene glycol of approximate number average molecular weight 12,000 g/mol (OH number=10±1.5 mg KOH/g) was poured in a 250 ml three neck flask and dried under vacuum at 80° C. for 1 hour. After the vacuum was released and replaced with argon, 0.19 g (0.25 mmol) of DOTL catalyst and 5.83 g (26.3 mmol) of isophorone diisocyanate (IPDI) was added and the reaction mixture was stirred for 2 hours at the same temperature. In the second step 26.3 mmol of a silicon-containing heterocycle described in Table 2 below was added and kept stirring at 80° C. for 4 hours. After the above-described procedure, the sample was collected and analyzed in IR spectrometer. No bands for NCO groups were observed, meaning that all of the NCO groups were reacted.

Comparative Example 2: 140 g (12.5 mmol) of polypropylene glycol of approximate number average molecular weight 12,000 g/mol (OH number=10 mg KOH/g) was poured in a 250 ml three neck flask and dried under vacuum at 80° C. for 1 h. After the vacuum was released and replaced with argon, 0.19 g (0.25 mmol) of DOTL catalyst and 5.83 g (26.3 mmol) of isophorone diisocyanate (IPDI) was added and the reaction mixture was stirred for 2 hours at the same temperature. In the second step 4.71 g (26.3 mmol) of (3-aminopropyl)trimethoxysilane was added and kept stirring at 80° C. for 3 hours. After the above-described procedure, the sample was collected and analyzed in IR spectrometer. No bands for NCO groups at 2260 cm$^{-1}$ were observed, meaning that all of the NCO groups were reacted.

The viscosity of the obtained prepolymers after the endcapping was measured at 25° C. by Anton Paar MCR 302 Rheometer in neat conditions using PP25βTG stirring plate.

TABLE 2

| Prepolymer | Endcapper | Viscosity (Pa · s) |
|---|---|---|
| Comp. Ex. 2 | 3-aminopropyltrimethoxysilane | 642.1 |
| Ex. 5 | 8-ethyl-2,2-dimethoxy-1,6,2-oxazasilocane | 225.1 |
| Ex. 6 | 2,2-dimethoxy-8-((1,1,2,2,3,3,4,4-octafluorobutoxy)-methyl)-1,6,2-oxazasilocane | 214.8 |

The invention claimed is:

1. A silylated polyurethane that is the reaction product of:
   a) at least one polyol having a number average molecular weight of from 1000 to 50,000 g/mol;
   b) at least one polyisocyanate; and
   c) at least one silicon-containing heterocycle of the general formula (I)

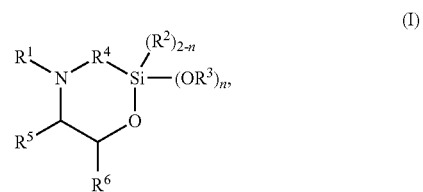

(I)

wherein $R^1$ is hydrogen;
$R^2$ and $R^3$ are same or different and are, independently from one another, selected from a linear or branched, substituted or unsubstituted $C_1$-$C_{20}$ alkyl or $C_6$-$C_{18}$ aryl residue which may be interrupted by at least one heteroatom;
$R^4$ is selected from a linear or branched, substituted or unsubstituted $C_1$-$C_{20}$ alkylene residue which may be interrupted by at least one heteroatom;
$R^5$ and $R^6$ are same or different and are, independently from one another, selected from the group consisting of hydrogen, a linear or branched, substituted or unsubstituted $C_1$-$C_{20}$ alkyl or $C_6$-$C_{18}$ aryl which may be interrupted by at least one heteroatom, a $C_4$-$C_8$ cycloalkyl, or $R^5$ and $R^6$ may form a ring; and
n is 0, 1 or 2.

2. The silylated polyurethane according to claim 1, wherein the silicon-containing heterocycle of the general formula (I) is the product of a one-step reaction of at least one epoxide compound of the general formula (II)

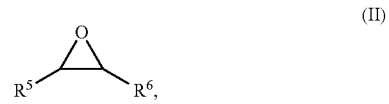

(II)

wherein $R^5$ and $R^6$ are the same as defined for the general formula (I) above, and
at least one aminoalkoxysilane having a primary amino group in the presence of a catalyst.

3. The silylated polyurethane according to claim 2, wherein the aminoalkoxysilane has the general formula (III)

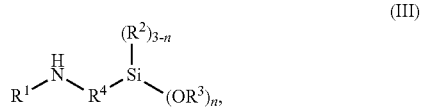

(III)

wherein R¹ to R⁴ are the same as defined for the general formula (I); and n is 0, 1, 2 or 3.

4. The silylated polyurethane according to claim 1, wherein n in general formula (III) is 3.

5. The silylated polyurethane according to claim 1, wherein the polyol is a polyether polyol.

6. The silylated polyurethane according to claim 1, wherein n in the general formula (I) is 2.

7. The silylated polyurethane according to claim 1, wherein $R^3$ is selected from a $C_1$-$C_8$ alkyl residue.

8. Cured reaction products of the silylated polyurethane according to claim 1.

9. A curable composition comprising the silylated polyurethane according to claim 1.

10. A curable composition comprising the silylated polyurethane according to claim 1 and further comprising at least one component selected from plasticizers, stabilizers, antioxidants, fillers, reactive diluents, drying agents, adhesion promoters, UV stabilizers, rheological agents, solvents and mixtures thereof.

11. An adhesive, sealant, foam and/or coating comprising the curable composition according to claim 10.

12. A method for preparing a silylated polyurethane by reacting:
a) at least one polyol having a number average molecular weight of from 1000 to 50,000 g/mol;
b) at least one polyisocyanate; and
c) at least one silicon-containing heterocycle of the general formula (I)

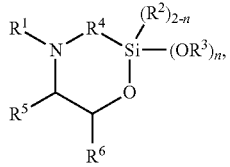

(I)

wherein $R^1$ is hydrogen;
$R^2$ and $R^3$ are same or different and are, independently from one another, selected from a linear or branched, substituted or unsubstituted $C_1$-$C_{20}$ alkyl or $C_6$-$C_{18}$ aryl residue which may be interrupted by at least one heteroatom;
$R^4$ is selected from a linear or branched, substituted or unsubstituted $C_1$-$C_{20}$ alkylene residue which may be interrupted by at least one heteroatom;
$R^5$ and $R^6$ are same or different and are, independently from one another, selected from the group consisting of hydrogen, a linear or branched, substituted or unsubstituted $C_1$-$C_{20}$ alkyl or $C_6$-$C_{18}$ aryl which may be interrupted by at least one heteroatom, and a $C_4$-$C_8$ cycloalkyl, or $R^5$ and $R^6$ may form a ring; and n is 0, 1 or 2.

13. The method of claim 12, wherein the polyisocyanate is a diisocyanate.

14. The method of claim 12, wherein $R^5$ and $R^6$ form a 4- to 8-membered alkyl ring.

15. The method of claim 12, wherein n is 2.

16. The method of claim 12, wherein $R^3$ is selected from methyl, ethyl or n-propyl.

17. The method of claim 12, wherein the silylated polyurethane is prepared by:
(a) reacting the at least one polyol having a number average molecular weight of from 1000 to 50,000 g/mol with the at least one polyisocyanate, with a stoichiometric excess of the NCO group of the polyisocyanate(s) with respect to the OH group of the polyol(s) to form a NCO-terminated polyurethane prepolymer; and
(b) reacting said NCO-terminated polyurethane prepolymer with the at least one silicon-containing heterocycle of the general formula (I)

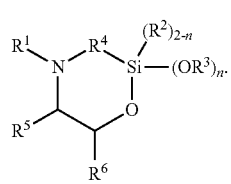

(I)

18. The silylated polyurethane according to claim 17, wherein a molar ratio of the NCO group of the polyisocyanate(s) to the OH group of the polyol(s) is from 1.01 to 2.0.

19. The method of claim 12 wherein the silylated polyurethane is prepared by:
(a) reacting the at least one polyisocyanate with the at least one silicon-containing heterocycle of the general formula (I)

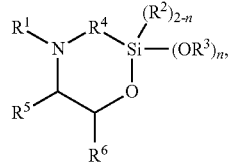

(I)

with a stoichiometric excess of the NCO group of the polyisocyanate(s) with respect to the amino group of the silicon-containing heterocycle(s) of the general formula (I); and
(b) reacting the reaction product obtained in step (a) with the at least one polyol having a number average molecular weight of from 1000 to 50,000 g/mol.

20. The silylated polyurethane according to claim 19, wherein a molar ratio of the NCO group of the polyisocyanate(s) to the amino group of the silicon-containing heterocycle(s) of the general formula (I) is from 1.1 to 3.0.

* * * * *

UNITED STATES PATENT AND TRADEMARK OFFICE
CERTIFICATE OF CORRECTION

PATENT NO.         : 10,889,682 B2
APPLICATION NO.    : 16/742988
DATED              : January 12, 2021
INVENTOR(S)        : Damke et al.

It is certified that error appears in the above-identified patent and that said Letters Patent is hereby corrected as shown below:

In the Specification

Column 15, Line 3 - 4 change "2-ted-butyl-1,1,3,3-tetramethylguanidine" to --2-tert-butyl-1,1,3,3-tetramethylguanidine--.

Column 19, Line 41 change "MS 5203H, MS 5303H" to --MS S203H, MS S303H--.

Column 21, Line 59 change "PP25βTG" to --PP25/TG--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*